United States Patent
Mowrey

(10) Patent No.: US 6,512,039 B1
(45) Date of Patent: Jan. 28, 2003

(54) ADHESIVES FOR BONDING PEROXIDE-CURED ELASTOMERS

(75) Inventor: Douglas H. Mowrey, Titusville, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/990,914

(22) Filed: Nov. 16, 2001

(51) Int. Cl.⁷ .............. C08J 3/00; C08K 3/34; C08L 83/00; C08L 75/00; C08L 27/00
(52) U.S. Cl. .......... 524/492; 524/493; 524/506; 524/507; 524/508; 524/509; 524/519
(58) Field of Search ............... 524/492, 493, 524/506, 507, 508, 509, 519

(56) References Cited

U.S. PATENT DOCUMENTS

| | | |
|---|---|---|
| 2,444,536 A | 7/1948 | Searle |
| 2,462,835 A | 3/1949 | Arnold et al. |
| 2,725,373 A | 11/1955 | Reynolds |
| 3,258,388 A | 6/1966 | Coleman et al. |
| 3,282,883 A | 11/1966 | DeCrease et al. |
| 3,824,217 A | 7/1974 | Barker |
| 3,830,784 A | 8/1974 | Manino et al. |
| 3,968,067 A | 7/1976 | Burke, Jr. |
| 4,070,825 A | 1/1978 | Kronogard |
| 4,098,933 A | 7/1978 | Burkhardt et al. |
| 4,145,816 A | 3/1979 | Stobbe et al. |
| 4,167,500 A | 9/1979 | Jazenski et al. |
| 4,243,566 A | 1/1981 | Burke, Jr. |
| 4,433,095 A | 2/1984 | Hombach et al. |
| 4,483,962 A | 11/1984 | Sadowski |
| 4,581,092 A | 4/1986 | Westley |
| 4,663,377 A | 5/1987 | Hombach et al. |
| 4,988,753 A | 1/1991 | Rullmann et al. |
| 5,036,122 A | 7/1991 | Auerbach et al. |
| 5,157,074 A | 10/1992 | Metzger et al. |
| 5,200,489 A | 4/1993 | Jacobs et al. |
| 5,252,696 A | 10/1993 | Laas et al. |
| 5,296,160 A | 3/1994 | Tirpak et al. |
| 5,306,740 A | 4/1994 | Laas et al. |
| 5,496,884 A * | 3/1996 | Weih et al. .......... 524/503 |
| 5,534,991 A | 7/1996 | Maeda et al. |
| 6,103,786 A | 8/2000 | Hoch et al. |
| 6,132,870 A | 10/2000 | Halladay et al. |
| 6,268,422 B1 | 7/2001 | Weih et al. |

* cited by examiner

*Primary Examiner*—Patrick D. Niland
(74) *Attorney, Agent, or Firm*—Miles B. Dearth

(57) ABSTRACT

What is disclosed is an adhesive composition that exhibits substantial durability in bonding peroxide cured elastomers to many substrates. The invention is directed to adhesives consisting essentially of a diluent, a maleimide compound, acid scavenger, a polymeric film former and precipitated silica, optionally a phenolic resole, polyyisocyanate, or isocyanatosilane. The present invention is further directed to a method of bonding peroxide-curable elastomers to metallic surfaces whereby the substrate ius coated with the adhesive composition, drying the adhesive composition coating, applying a peroxide-cured elastomer to the adhesive composition coating, and curing the assembly with heat and/or pressure.

20 Claims, No Drawings

ADHESIVES FOR BONDING PEROXIDE-CURED ELASTOMERS

FIELD OF THE INVENTION

The present invention relates to a solvent or aqueous adhesive composition for bonding a peroxide-cured elastomer to a substrate where the bonding takes place during the vulcanization of the elastomer. More specifically, the present invention relates to aqueous or solvent-based adhesive composition comprising a maleimide curing agent, film former, acid scavenger and a silicate.

BACKGROUND OF THE INVENTION

In applications involving the bonding of elastomeric substrates to surfaces such as metal surfaces, an adhesive must exhibit an affinity for the elastomeric substrate as well as possess the ability to withstand degradation by high temperature fluids or corrosive materials.

Various solvent-based and aqueous-based adhesives for bonding elastomeric materials have been developed in a continuing effort to obtain the ultimate aqueous adhesive for bonding elastomeric substrates. For example, U.S. Pat. No. 4,167,500 describes an aqueous adhesive composition that contains a water dispersible novolak phenolic resin, a methylene donor such as an acetal homopolymer or acetal copolymer, and water. The phenolic resins described are primarily derived from resorcinol and alkylphenols such as p-nonylphenol although various other polyhydroxy phenols are mentioned, such as phloroglucinol and pyrogallol.

U.S. Pat. No. 4,483,962 describes a terpolymer latex of an emulsion-polymerized terpolymer of at least one 2,3-dihalo-1,3-butadiene monomer, at least one monoalkenyl aromatic alkylhalide monomer, and at least one olefinically unsaturated monomer. The terpolymer latex utilizes a surfactant such as an anionic surfactant or a mixture of an anionic surfactant and a non-anionic surfactant.

U.S. Pat. No. 4,988,753 describes an aqueous bonding composition containing (1) a mixture of chlorosulfonated polyethylene and vinyl chloride/vinylidene chloride/acrylic acid copolymer, (2) an organic polynitroso compound, and (3) a coreactive compound selected from diallyl acrylamide and phenylene bis-maleic acid imide. The adhesive composition may also optionally contain adhesion promoters, fillers, and processing aids.

U.S. Pat. No. 5,036,122 describes an aqueous adhesive composition which is a blend of a latex of a polymerized conjugated diene, a poly-C-nitroso compound, and a maleimide compound, e.g., a bismaleimide.

For example, U.S. Pat. No. 3,258,388, discusses the incorporation of poly-C-nitroso aromatic compounds into conventional rubber-to-metal adhesives to improve bonding. The conventional adhesives into which these compounds may be incorporated include compositions containing thermo-setting condensation polymers; polymers and copolymers of polar, ethylenically unsaturated materials; halogenated rubbers; and polyisocyanates.

U.S. Pat. No. 3,282,883 discloses an adhesive composition that includes dinitrosobenzene, chlorosulfonated polyethylene, and an orthoalkoxy aryl diisocyanate. This composition is produced by dissolving and/or dispersing the components in an organic solvent. The composition is for bonding natural and synthetic rubbers, such as ethylene-propylene-nonconjugated diene terpolymers, neoprene, styrene-butadiene rubber, butyl rubber, halobutyl rubber, butadiene-acrylonitrile, halosulfonated polyethylene rubber, polyurethane rubber, and polyacrylate rubber. The rubbers may be bonded to themselves or to other substrates, such as metals.

U.S. Pat. No. 3,824,217 discloses combining an oxime compound with an excess of a polyisocyanate compound, so that all oxime groups are reacted with isocyanate. The resulting compound may be used in compositions for bonding rubbers to primed metal substrates.

U.S. Pat. No. 3,830,784 discloses an adhesive composition that includes a poly-C-nitroso aromatic compound, a polyisocyanate that is reactive at room temperature or greater, and an acidic halogen-containing polymer. The composition is produced by dissolving the acidic halogen-containing polymer and the aromatic polyisocyanate in an organic solvent, and the poly-C-nitroso aromatic compound is dispersed in the resulting solution. The resultant composition is shelf-stable and forms a strong adhesive bond between the substrate and the elastomer during vulcanization thereof.

U.S. Pat. No. 4,581,092 discloses a cold-vulcanizable adhesive system for bonding vulcanized rubbers. The system is of particular use in creating durable seams between rubber strips or sheets. The adhesive compositions include butyl rubber, a polyisocyanate compound, and at least one of a nitroso compound and an oxime compound, with the oxime compound requiring the additional presence of an oxidizing agent. DE 22 28 544 describes a binder for the production of composites by vulcanization of rubber mixtures onto metals or other stable substrates. In addition to chlorosulfonated polyethylene, chlorinated rubber, polyisocyanates and a phenolic resin, this binder also contains dinitrosobenzene in the form of a suspension in solvents.

The prior art adhesive compositions for bonding sulfur-cured vulcanizable elastomers where bonding takes place during vulcanization suggest as an essential component one or more of a dinitroso compound, an oxime compound, a polyisocyanate compound, and an oxidizing agent. The toxicity of these ingredients poses handling and safety problems. When bonding peroxide-cured elastomers, it has been found that dinitroso compounds (e.g. poly-C nitroso), particularly poly(p-dinitrosobenzene, (poly DNB) or p-dinitrosobenzene (DNB) sublime at temperatures encountered in vulcanizing the elastomers.

U.S. Pat. No. 6,132,870 discloses a reinforced composite including an elastomer of low unsaturation, a reinforcing fiber, an adhesive composition that bonds the elastomer to the coated reinforcing fiber including a halogenated polyolefin, a nitroso compound, a maleimide, the maleimide present in an amount of at least 50% by weight of the halogenated polyolefin.

Thus, there remains a need for new adhesive compositions that are simple, safe, stable, and effective for the bonding of peroxide-cured elastomers to substrates, particularly metal and glass substrates. Effective adhesives will have high rubber retention under conventional peel tests, and good pre-bake resistance.

SUMMARY OF THE INVENTION

The present invention is an aqueous adhesive composition that is poor in bonding sulfur-cured elastomers, but is especially advantageous for bonding peroxide-cured elastomers, in that the bonded peroxide-cured elastomer using the adhesives according to the present invention exhibits durable, rubber-tearing bonds between the vulcanized rubber and substrates. Durability means the adhesive produces a high degree of rubber retention in bond failure, high peel strength, and an environmentally resistant adhesive bond. The peroxide-bonding elastomer according to the invention resides in an adhesive, substantially absent a nitrso compound, and consisting essentially of a diluent, a film forming polymer, a maleimide compound, a optional precipitated silicate, and an optional metal scavenger.

The present invention is further directed to a method of bonding a peroxide-curable elastomer to a metallic surface comprising coating the substrate with the above adhesive composition, drying the adhesive composition, applying a peroxide-cured elastomer to the adhesive composition coating, and curing the assembly with heat and/or pressure.

The present invention is also directed to adhesive composition, and composite article of manufacture comprising a peroxide-cured elastomer bonded to a substrate with the adhesive composition.

DESCRIPTION OF THE PREFERED EMBODIMENTS

The peroxide-curable rubber substrates bonded by the invention are the conventional vulcanizable rubbers that must contain a peroxide as the curing agent. Although in a few special instances, both a sulfur-curing component and a peroxide curing component can both be present, there must be a peroxide curing agent present in the elastomers bonded according to the invention. The adhesive compositions of the present invention have been found to have surprising strong bonding characteristics when bonding peroxide cured elastomers. These elastomers are known to be difficult to bond to substrates, especially to metal substrates. Surprisingly, it has been discovered that the adhesive compositions of the present invention provide excellent adhesion to peroxide-cured elastomeric materials formulated in numerous specific embodiments, widely available and beyond the scope of this disclosure. Examples of the peroxide-cured rubber used as vulcanizable rubber bonded according to the invention herein include the following:

Homopolymers of conjugated diene compound such as isoprene, butadiene, and chloroprene. Examples include polyisoprene rubber (IR), polybutadiene rubber (BR), natural rubber (NR) and polychloroprene rubber.

Copolymers of said conjugated diene compound with a vinyl compound such as styrene, acrylonitrile, vinylpyridine, acrylic acid, methacrylic acid, alkyl acrylate, and alkyl methacrylate. Examples include styrene-butadiene copolymer rubber (SBR), vinylpyridine butadiene styrene copolymer rubber, acrylonitrile butadiene copolymer rubber (NBR), hydrogenated acrylonitrile butadiene copolymer rubber(HNBR), ZSC-cured hydrogenated nitrile-butadiene rubber, acrylic acid butadiene copolymer rubber, methacrylic acid butadiene copolymer rubber, methyl acrylate butadiene copolymer rubber, and methyl methacrylate butadiene copolymer rubber.

Copolymers (EPDM) of olefin with non-conjugated diene. Examples include ethylene-propylene-cyclopentadiene terpolymer, ethylene-propylene-5-ethylidene-2-norbornene terpolymer, and ethylene-propylene-1,4-hexadiene terpolymer.

Peroxide-cured silicone elastomers known for exhibiting long term performance at high temperatures and are distinguished from addition cured, or condensation-cured grades which are not used herein. Silicone elastomers bonded according to the invention include heat-curable elastomeric organosilicon polymers, that is, organopolysiloxanes, which, upon heating in combination with an appropriate curing agent, are converted to the solid, elastic state. Silicone elastomers are well known in the art and any variety is suitable. The conventional silicone rubber typically contains as a curing agent, benzoyl peroxide or di-t-butyl peroxide, as well as conventional filler and other rubber compounding materials.

Fluorinated elastomers are derived from hydrocarbons, including vinylidene fluoride, hexafluoropropylene and commercially available from a number of suppliers. A detailed discussion of the various types of fluoroelastomers is contained in an article by R. G. Arnold, A. L. Barney and D. C. Thompson that appeared in the July, 1973 issue of a journal entitled "Rubber Chemistry and Technology" (Volume 46, pp. 619–652). A fluoroelastomer is distinguished from a thermoplastic fluoropolymer principally by whether plastic deformation occurs upon stressing the fluoroelastomer to 100% elongation. Fluoroplastics undergo deformation on stretching and are unsuitable herein.

The representative fluorocarbon elastomers bonded according to the invention include polymers of 1,1-dihydroperfluorobutyl acrylate; copolymers of vinylidene fluoride and chlorotrifluoroethylene; vinylidene fluoride and hexafluoropropylene; vinylidene fluoride and hydropentafluoropropylene; tetrafluoroethylene and perfluoro(methyl vinyl ether); vinylidene fluoride and perfluoro(methyl vinyl ether); tetrafluoroethylene and propylene; and terpolymers of vinylidene fluoride, hexafluoropropylene, and tetrafluoroethylene; vinylidene fluoride, tetrafluoroethylene and perfluorovinyl ether; vinylidene fluoride, tetrafluoroethylene, and propylene; vinylidene fluoride and hydropentafluoropropylene and tetrafluoroethylene. The most preferred fluoroelastomer modified according to the invention is commercially available under the Viton ® designation, such as a copolymer of vinylidenefluoride and hexafluoropropylene, or a terpolymer of vinylidenefluoride, tetrafluoroethylene, and hexafluoropropylene.

Film Former

The term "film former" as used herein refers to a polymer substance that will form a film and which wets out a substrate surface when formulated, to form a continuous skin when solvent is removed after drying.

In a solvent-borne embodiment, the film former is soluble in the solvent and used in an amount. In an aqueous-based embodiment, the film former is dispersed or is a colloidal dispersion.

The halogen-containing polymer film former component of the adhesive compositions can be a natural or synthetic addition-polymerized elastomer. The halogens employed in the halogenated elastomers will usually be chlorine or bromine, although fluorine can also be used. A combination of halogen atoms can also be employed in which case the halogen-containing polymer elastomer will have more than one halogen substituted thereon. Exemplary are the halogen-containing polyolefinic elastomers. Their preparation is well known in the art and many types are available commercially. Representative halogen-containing polyolefinic elastomers include, but are not limited to chlorinated natural rubber, chlorinated polychloroprene, chlorinated polybutadiene, chlorinated butadiene-styrene copolymers, chlorinated ethylene propylene copolymers, chlorinated ethylene/propylene/non-conjugated diene terpolymers, chlorinated polyethylene, chlorosulfonated polyethylene, copolymers of α-chloroacrylonitrile and 2,3-dichloro-1,3-butadiene, brominated poly(2,3-dichloro-1,3-butadiene), copolymers of α-haloacrylonitriles and 2,3-dichloro-1,3-butadiene, chlorinated poly(vinyl chloride), vinyl chloride-vinylidene chloride-acrylate or acrylic acid terpolymers, and the like, including mixtures of such halogen-containing elastomers. An exemplary mixture is based on chlorosulfonated polyethylene and chlorinated natural rubber. Thus, substantially any of the known halogen-containing derivatives of natural and synthetic elastomers can be employed in the practice of this invention, including mixtures of such elastomers. Chlorosulfonated polyethylene elastomers alone or in combination with chlorinated natural rubber are the most preferred halogen-containing film former. Chlorosulfonated polyethylene is commercially available from E. I. Du Pont de Nemours & Co. under the HYPALON ® mark. If chlorinated polyolefin (CPE) is employed as a primary film former, the chlorine content should be greater than about 60 percent and the CPE molecular weight greater than about 500. Such chlorine contents can be obtained by a process involving the dispersion and chlorination of high surface area polyolefinic particles in an aqueous medium taught in U.S. Pat. No. 5,534,991. Chlorinated natural rubber is presently most preferred and several grades are commercially available from Bayer Aktiengesellschaft, under the PERGUT® mark.

As an aqueous adhesive embodiment, the polymeric film-forming component is preferably a latex of a halogenated polyolefin. The halogenated polyolefin of the latex can essentially be any natural or synthetic halogenated polyolefin elastomer. The halogens employed in the halogenated polyolefinic elastomer are typically chlorine or bromine, although fluorine can also be used. Mixtures of halogens can also be employed in which case the halogen-containing polyolefinic elastomer will have more than one type of halogen substituted thereon. Except for CPE, the amount of halogen does not appear critical and can range from as low as about 3 weight percent to more than 70 weight percent, depending on the nature of the base elastomer or polymer. Halogenated polyolefins and their preparation are well-known to those skilled in the art.

A latex of the halogenated polyolefin of the present invention can be prepared according to methods known in the art such as by dissolving the halogenated polyolefin in a solvent and adding a surfactant to the resulting solution. Water can then be added to the solution under high shear to emulsify the polymer. The solvent is then stripped to obtain a latex having a total solids content of from about 10 to 60, preferably 25 to 50, percent by weight. The latex can also be prepared by emulsion polymerization of chlorinated ethylenically unsaturated monomers.

The utilization of chlorinated natural rubber either in solvent solution or as a latex is most preferred in forming the adhesive of the present invention inasmuch as generally other types of rubbers, halogenated and non-halogenated, and the like do not result in as good pre-bake properties. Accordingly, other types of rubbers are less preferred film formers. Aqueous dispersions of halogenated or preferably chlorinated natural rubbers are made by conventional techniques for producing aqueous dispersions. Examples of suitable processes and chlorinated natural rubbers which can be utilized are set forth in U.S. Pat. Nos. 3,968,067; 4,070,825; 4,145,816; 4,243,566; and 6,103,786; the entire disclosure of each is hereby fully incorporated by reference. Generally the various processes involve dissolving the elastomer in an organic solvent, followed by forming a water-based dispersion thereof with the aid of a surfactant. Any remaining solvent can be removed as by stain stripping. The chlorinated natural rubber generally contains from about 60% to about 75% and desirably from about 65% to about 68% by weight of chlorine therein based upon the total weight of the natural rubber. The chlorinated natural rubber latex generally contains from about 25 to about 75 and desirably from about 40 to about 60 weight percent of solids. The amount of the film former polymer on a dry weight basis generally ranges from about 1 to about 50 weight %, preferably 5 to 40 weight% of the adhesive.

Supplemental Film Former

A supplemental non-halogenated film-forming polymeric material may be employed. The supplemental film-forming polymer can be a latex, organic solvent solution, dispersion, emulsion or other form. Examples of such non-halogenated polymeric materials in aqueous or solvent-carrier form include epoxy resins, phenolic resins, resorcinol resins, melamine resins, styrenebutadiene copolymer rubber, natural rubber, polyacrylates, polybutadienes and polyvinylacetates. It should be noted that a non-halogenated film former can be used as a supplemental film-former. An epoxy resin, a phenolic resin, or a phenolic-epoxy resin, although acting as a film former can be employed for its function as an acid-scavenging compound.

Some embodiments of the invention contain a polyisocyanates as a supplemental film former. Polyisocyanates are adaptable for both aqueous-based and organic solvent-based embodiments. A supplemental film forming polyisocyanate is conventionally used as is in liquid form, or in solution with a suitable organic solvent. Particularly suitable polyisocyanates are those derived from monomers corresponding to the $R(NCO)_n$ formula, wherein R represents an aliphatic hydrocarbon radical containing 4 to 18 carbon atoms, a cycloaliphatic hydrocarbon radical containing 5 to 15 carbon atoms, an aromatic hydrocarbon radical containing 6 to 40 carbon atoms or an araliphatic hydrocarbon radical containing 7 to 40 carbon atoms, and n is 1 to 3.

Examples of suitable polyisocyanates as such or employed to make other polyisocyanates adducts or pre-polymers include, but are not limited to, 1,4-diisocyanatobutane, 1,5-diisocyanato-2,2-dimethylpentane, 2,2,4- and 2,4,4-trimethyl-1,6-diisocyanatohexane, 1,10-diisocyanatodecane, 4,4'-diisocyanatodicyclohexylmethane, 1,6-hexamethylene diisocyanate, 1,12-dodecane diisocyanate, cyclobutane-1,3-diisocyanate, cyclohexane-1, 3- and/or 1,4-diisocyanate, 1-isocyanato-3,3,5-trimethyl-5-isocyanatomethyl cyclohexane (isophorone or IPDI), 2,4- and/or 2,6-hexahydrotoluylene diisocyanate, hexahydro-1, 3- and/or 1,4-phenylene diisocyanate, perhydro-2,4'- and/or -4,4'diphenylmethane diisocyanate, 1,3- and/or 1,4-phenylene diisocyanate, 2,4- and/or 2,6-toluylene diisocyanate, diphenyl methane-2,4'- and/or -4,4'-diisocyanate, naphthalene-1,5-diisocyanate, triphenyl methane-4,4'4"-triisocyanate and polyphenyl polymethylene polyisocyanates obtained by phosgenating-aniline/formaldehyde condensation products.

The polyisocyanates of the aqueous adhesive compositions of the present invention can be rendered hydrophilic by reaction with cationic, anionic and/or nonionic compounds containing isocyanate-reactive groups, or by admixture with external emulsifiers, or both, as is known in the art. Hydrophilically modified polyisocyanates are water-dispersible, and can be used per se, or together with an external emulsifier, or as both, are well known in the art, and are described, for example, in U.S. Pat. Nos. 4,663,377; 5,200, 489; and 5,252,696. Suitable water-dispersible polyisocyanates are polyisocyanate adducts containing urea, biuret, urethane, allophanate, uretdione, carbodiimide, oxadiazinetrione and isocyanurate groups. These adducts may be prepared from any known polyisocyanates previously set forth by known methods. It is also possible to use mixtures of any of these polyisocyanates and/or polyisocyanate adducts.

Known blocked isocyanates can be used as the polyisocyanate. Polyisocyanates having partial, substantial or totally blocked NCO groups are described in U.S. Pat. Nos. 5,296,160; 5,157,074; and 4,098,933, each is hereby incorporated by reference. An exemplary hydrophilically modified polyisocyanate compound is available from Bayer Inc. of Pittsburgh, Pa., under the trade designation Desmodur® DA. This compound is described as a water-dispersible, solvent free polyisocyanate based on hexamethylene diisocyanate (HDI) having a NCO content of 18.5 to 20.5%. The compound is believed to be a trisisocyanatocycloalkylisocyanurate compound. With optional water-dispersible isocyanate, a polyisocyanate based on 1,6-hexamethylene diisocyanate is preferred. These and other suitable polyisocyanates and adducts thereof and processes for synthesizing the same are described, for example, in U.S. Pat. Nos. 4,663,377; 4,433,095; 5,200,489; and 5,252,696, the entire disclosure of each which is hereby incorporated by reference.

Optional polyisocyanates used in solvent-based embodiments include diisocyanates containing from 2 to 40 carbons in the radical between the isocyanate moieties. Exemplary polyisocyanates include ethylene diisocyanate, trimethylene diisocyanate, hexamethylene diisocyanate, propylene-1,2-diisocyanate, ethylidene diisocyanate, cyclopentylene-1,3-diisocyanate, the 1,2-,1,3- and 1,4-cyclohexylene diisocyanates, the 1,3- and 1,4-phenylene diisocyanates, diphenylmethane diisocyanates, polymethyleneisocyanates, the 2,4- and 2,6-toluene diisocyanates, the 1,3- and 1,4-xylylene diisocyanates, bis(4-isocyanatoethyl) carbonate, 1,8-diisocyanato-p-methane, 1-methyl-2,4-diisocyanatocyclohexane, the chlorophenylene diisocyanates, naphthalene-1,5-diisocyanate triphenylmethane-4,4', triisocyanate, isopropylbenzene-alpha-4-diisocyanate, 5,6-bicyclo[2.2.1] hept-2-ene diisocyanate, 5,6-diisocyanatobutylbicyclo [2.2.1] hept-2-ene. Exemplary commercial products are trimethylhexamethylene diisocyanate available from VEBA, heptadecyl (C17) diisocyanate, DDI 1410 an aliphatic C-36 diisocyanate available from the Henkel Corporation of Minneapolis, Minn. and Isonate 143L diisocyanate, a modified diphenylmethane diisocyanate (MDI) available from Upjohn Corp. Further urethane components are isophorone diisocyanate available from VEBA and Desmodur® N an aliphatic triisocyanate available from Mobay. Desmodur® N is believed to be a reaction product of 3 moles of hexamethylene diisocyanate and water having an isocyanate equivalent weight of 191. Other adducts or prepolymers of the polyisocyanate include Desmodur® L and Mondur® CB which are adducts of tolylene diisocyanate (TDI).

Optional isocyanatosilane adducts can be employed.

Isocyanatosilnes are a reaction product of an isocyanate-reactive silane and a molar excess of isocyanate that is co-reactive therewith. The reaction product is preferably used in a form free of isocyanate monomers.

Representative non-isocyanate-organofunctional silanes which are reactive with isocyanate groups and suitable for making an adduct with an isocyanatosilane or polyisocyanate include without limitation those silanes that contain a group with an active, or abstractible hydrogen, such as amino, mercapto, and hydroxy groups.

Representative hydroxyl group-containing silanes include but are not limited to compounds of the general structure A:

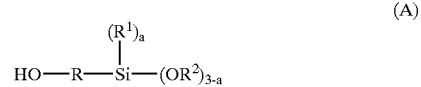

(A)

wherein R is a divalent aliphatic, cycloaliphatic or aromatic saturated or unsaturated radical having from 1 to 20 carbon atoms, and is preferably an alkylene radical having from 1 to 9, most preferably 2 to 4, carbon atoms; $R^1$ is a monovalent aliphatic, cycloaliphatic or aromatic radical having from 1 to 20 carbon atoms, and is preferably selected from the group consisting of alkyl radicals having from 1 to 4 carbon atoms, cycloalkyl radicals having from 4 to 7 ring carbon atoms, and aryl radicals having 6, 10, or 14 nuclear carbon atoms, and including such aryl radicals containing one or more substituent alkyl groups having from 1 to 4 carbon atoms; $R^2$ is a monovalent aliphatic, cycloaliphatic or aromatic organic radical containing from 1 to 8 carbon atoms, and is preferably selected from the group consisting of alkyl radicals having from 1 to 4 carbon atoms, $R^3$—O—$R^4$, and

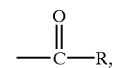

where $R^3$ is an alkylene group having from 1 to 4 carbon atoms (methyl, ethyl, propyl, butyl) and $R^4$ is an alkyl group having from 1 to 4 carbon atoms; and a is zero or 1, preferably zero;

Aminofunctional silanes include but are not limited to those having the structure (B)

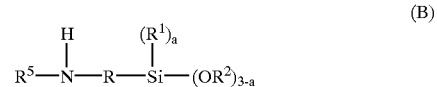

(B)

wherein R, $R^1$, $R^2$ and a are as previously defined for (A); and $R^5$ is selected from the group consisting of hydrogen, monovalent aliphatic radicals having from 1 to 8 carbon atoms, monovalent cycloaliphatic radicals having from 4 to 7 ring carbon atoms, phenyl, alkaryl radicals having 6 nuclear carbon atoms and containing one or more substituent alkyl groups having from 1 to 4 carbon atoms, and —$R^6$—NH—$R^7$, wherein $R^6$ is selected from the group consisting of divalent aliphatic, cycloaliphatic and aromatic radicals having from 1 to 20 carbons, there being preferably at least two carbon atoms separating any pair of nitrogen atoms, with $R^6$ being preferably an alkylene group of 2 to 9 carbon atoms; and $R^7$ being the same as $R^5$ and preferably is hydrogen.

Mercaptofunctional silanes include but are not limited to those having the structure (C)

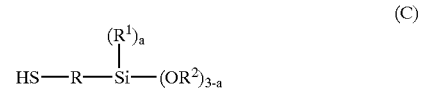

(C)

wherein R, $R^1$, $R^2$ and a are as previously defined in A or B;

Other preferred organosilane compounds have a single organic chain having from 1 to 20 carbon atoms, said chain having at least one extractable hydrogen atom, said extractable hydrogen atom preferably being attached to a functional group separated from the silicon atom by at least 3 interconnected carbon atoms.

Representative isocyanate-reactive organosilanes where "g" and "d" represent gamma and delta, respectively, are hydroxypropyltrimethoxysilane,
hydroxypropyltriethoxysilane,
hydroxybutyltrimethoxysilane,
g-aminopropyltrimethoxysilane
g-aminopropyltriethoxysilane,
methylaminopropyltrimethoxysilane,
g-aminopropyltripropoxysilane,
g-aminoisobutyltriethoxysilane,
g-aminopropylmethyldiethoxysilane,
g-aminopropylethyldiethoxysilane,
g-aminopropylphenyldiethoxysilane,
d-aminobutyltriethoxysilane,
d-aminobutylmethyldiethoxysilane,
d-aminobutylethyldiethoxysilane,
g-aminoisobutylmethyldiethoxysilane, N-methyl-g-aminopropyltriethoxysilane, N-phenyl-g-aminoisobutylmethyldieth oxysilane, N-ethyl-d-aminobutyltriethoxysilane, N-g-aminopropyl-g-aminopropyltriethoxysilane, N-.beta.-aminoethyl-g-aminoisobutyltriethoxysilane, N-g-aminopropyl-d-aminobutyltriethoxysilane, N-aminohexyl-g-aminoisobutylmethyldiethoxysilane, methylaminopropyltriethoxysilane, g-aminopropylmethoxydiethoxysilane, and the like.

Isocyanatosilane, also referred to as adducts are formed by reaction of an exemplary organofunctional silane with a polyisocyanate, such as aliphatic, cycloaliphatic, and aromatic polyisocyanates, as these terms are generally interpreted in the art. Suitable polyisocyanates reacted with the organosilanes to in preparation of isocyanatosilanes include without limitation the aforementioned polyisocyanates. Thus it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, are suitable for forming an isocyanatosilane. The isocyanatosilane may contain, but preferably does not contain any appreciable residual free polyisocyanate. A more detailed discussion of iocyanatosilanea is found in co-pending PCT App. No. PCT/US01/16841, filed May 23, 2001, designating the United States. An example of an isocyanato silane useful in the present invention is Silquest™ A-1310, which is gamma-isocyanatopropyltriethoxysilane.

Isocyanatosilane adducts can be readily prepared by effecting a reaction between a multifunctional organosilane and a polyisocyanate by adding the organosilane, preferably as a dilute solution, to the polyisocyanate, also preferably diluted, at a temperature in the range from about 10° to about 100° C., while agitating the mixture by a mechanical stirrer or similar device. While not essential, a suitable catalyst, such as dibutyltin dilaurate, can be employed. The reaction is essentially instantaneous, particularly when catalysts are employed, and is accompanied by a mild exotherm. It is noteworthy that the amount of polyisocyanate present during the reaction be such as to ensure obtaining an adduct having at least one isocyanate group. Thus it will be appreciated that the minimum amount, in molar equivalents of —NCO, of polyisocyanate required to form the adduct is one molar equivalent of NCO in excess of the amount, in molar equivalents of NCO required to react with all the active hydrogen of the silane reactant.

If employed, a supplemental polymeric film-forming component of the present invention can be utilized in an amount ranging from about 0.1 to 50, preferably from about 5 to 20 percent by dry weight (excluding solvent and water) of the adhesive composition. Expressed as phr, "weight parts per 100 weight parts of the fim forming polymer", the supplemental film former can be used at 5–95 phr.

A preferred optional supplemental film former is based on a brominated polymer of 2,3-dichloro-1,3-butadiene; 1,3-butadiene; 2,3-dibromo-1,3-butadiene; isoprene; 2,3-dimethylbutadiene; chloroprene; bromoprene; 2,3-dibromo-1,3-butadiene; 1,1,2-trichlorobutadiene; cyanoprene; hexachlorobutadiene and combinations thereof. It is particularly preferred to use 2,3-dichloro-1,3-butadiene as the monomer in a homopolymer or copolymer wherein a major portion of the polymer contains repeating units from 2,3-dichloro-1,3-butadiene. "Copolymerizable monomers" herein refers to monomers which are capable of undergoing copolymerization with the alkadiene monomers described above. Typical copolymerizable monomers useful in the supplemental film former include α-haloacrylonitriles such as α-bromoacrylonitrile and α-chloroacrylonitrile; α,β-unsaturated carboxylic acids such as acrylic, methacrylic, 2-ethylacrylic, 2-propylacrylic, 2-butylacrylic and itaconic acids; alkyl-2-haloacrylates such as ethyl-2-chloroacrylate and ethyl-2-bromoacrylate; styrene; styrene sulfonic acid; α-halostyrenes; chlorostyrene; α-methylstyrene; α-bromovinylketone; vinylidene chloride; vinyl toluenes; vinylnaphthalenes; vinyl ethers, esters, and ketones such as methyl vinyl ether, vinyl acetate, and methyl vinyl ketone; esters, amides, and nitriles of acrylic and methacrylic acids such as ethyl acrylate, methyl methacrylate, glycidyl acrylate, methacrylamide, and acrylonitrile; and combinations of such monomers.

Preparation of brominated polydichlorobutadiene is well known and taught in U.S. Pat. No. 2,725,373. Rubber-like products are obtained by bromination of allylic sites on polydichlorobutadiene polymers with free bromine or with brominating agents, such as N-bromosuccinimide (NBS) for example, in organic, preferably chlorinated solvents optionally inert to bromine, for example in chloroform, tetrachloromethane, chlorobenzene or even benzene. For a bromine content of 16 to 27% by weight, these thermoplastic rubber-like products are readily soluble in typical solvents. The brominated polydichlorobutadiene polymers are incorporated either as a solvent solution in organic diluent embodiments, or for water-based diluents, incorporated by forming a latex according to methods known in the art. The brominated polymer can be dissolved in a solvent, a surfactant can be added with water to the solution, and a phase-inversion under high shear force is carried out, followed by removal of the organic solvent to obtain a latex having a total solids content of from about 10 to 60, preferably 25 to 50 percent by weight.

Alternatively, a latex polymer can also be prepared by emulsion polymerization of chlorinated ethylenically unsaturated monomers via conventional emulsion polymerization process and brominated in the aqueous phase without the disperse particles coagulating or precipitating, according to U.S. Pat. No. 5,306,740. A preferred protective colloid for the latex is polyvinyl alcohol as described in more detail in U.S. Pat. No. 6,268,422, incorporated herein by reference.

Bonding Agent

The adhesive compositions of the present invention require a bonding agent containing two or more maleimide groups. Maleimides suitable for use in the present invention include, but are not limited to, all of the polymaleimide and bismaleimides, such as are described in U.S. Pat. No. 2,444,536 and U.S. Pat. No. 2,462,835, herein incorporated by reference. Suitable N,N'-linked bismaleimides contain maleimide groups that are either joined directly at the nitrogen atoms without any intervening structure or in which the nitrogen atoms are joined to and separated by an intervening divalent radical such as alkylene, cycloalkylene, oxydimethylene, phenylene (all 3 isomers), 2,6-dimethylene-4-alkyphenol, or sulfonyl. Preferred maleimide compounds include those formed conventionally by a condensation of maleic anhydride and a diamine compound which has a double bond originating from maleic anhydride at each terminus. A preferred bismaleimide resin employable in the present invention is a reaction product of two moles of maleic anhydride and one mole of an aromatic diamine. Examples of the aromatic diamine employable for this purpose include, but are not limited to, diaminobenzene, 4,4'-diamino-3,3'-dimethylbiphenyl, 1,4-diaminodiphenyl ether, 1,4-diaminodiphenylmethane, 2,2-bis(4-aminophenyl)propane, 1,4-diaminodiphenylsulfone, 1,3-bis (4-aminophenoxy)benzene, 1,4-bis(3-aminophenoxy) benzene, and bis(4-(3-aminophenoxy)phenyl)sulfone. M-phenylene-bis-maleimide is a presently preferred compound, and is available as "HVA-2" from E. I. du Pont de Nemours and Co., (Inc.). Other commercially available bismaleimide and polybismaleimide materials are "Bismaleimide" of Mitui Toatsu Chemical Co., Ltd., "Bismaleimide (ATU-BMI resin) of Ajinomoto Co., Ltd., "Kelimide (NE20200)" of Nippon Polyimide Co., Ltd., and "Compimide 353" of Technochemie Co., Ltd.

Polymaleimide compounds include aliphatic or aromatic polymaleimide. Aromatic polymaleimides having from about 1 to 100 aromatic nuclei wherein the maleimide groups are directly attached to each adjacent aromatic ring are preferred. An exemplary polymaleimide compound has the formula:

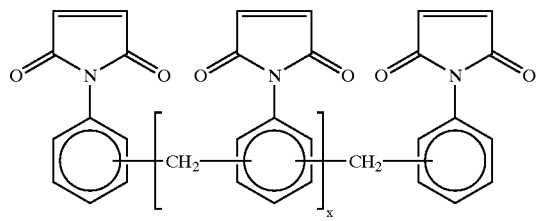

wherein x is from about 1 to 100. Such polymaleimides are commercially available under multiple trade names from different companies. A preferred polymaleimide is poly(bis) maleimide such as BMI-M-20 is supplied by Mitsui Toatsu Fine Chemicals Incorporated, which has the general structure:

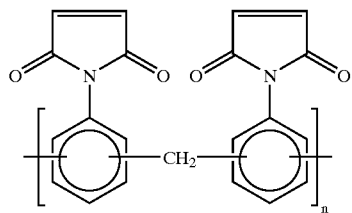

wherein n is from 2–100.

The polymaleimide is employed in an amount from 20 to 70 wt. %, preferably from 40 to 60 wt. % on dry weight of the adhesive. In terms of weight parts per hundred weight parts ("phr") of film former, the range is from 100 to about 2000 phr, preferably the polymaleimide is present in an amount from about 400 to about 1000 phr of film former, and most preferably from 500 to 900 phr of film former.
Diluent/Carrier The adhesive compositions of this invention are prepared by conventional means. For ease of application, as is conventional in this art, the components will be mixed and dispersed in an inert liquid diluents which are the primary carrier of the homogeneous, refined mixture of solids, and once the wet adhesive composition has been applied, can be readily removed by evaporation. Examples of suitable liquid diluents are water, aromatic and halogenated aromatic hydrocarbons such as benzene, toluene, xylene, chlorobenzene, dichlorobenzene, and the like; halogenated aliphatic hydrocarbons such as trichloroethylene, perchloroethylene, propylene dichloride and the like; ketones such as methyl ethyl ketone, methyl isobutyl ketone, and the like; ethers, naphthas, etc., including mixtures of such carriers. Preferred organic diluents are xylene and toluene, ortho- and para-chlorotoluene, optionally in combination with tetrachloroethylene. The amount of the diluent employed is that which provides a composition suitable for use as an adhesive. The organic solvent diluent/carrier amount will ordinarily be such as to provide a total solids content (TSC) ranging from about 5 to 80, preferably about 5 to about 40 percent by weight, and more preferredly 5 to 30 wt. %. Where water is used as the diluent/carrier, the TSC is typically in a range of from 20 to 45% TSC. In terms of wt. parts per 100 wt. parts of halogen-containing polyolefin ("phr"), the diluent can be used in an amount ranging generally from 20 to 4000 PHR.

When water is used as a diluent, the finely divided solid components should be predispersed using dispersing agent such as lignosulfonates including as a basic lignin monomer unit a substituted phenyl propane. These are commercially available under the trade designation as Marasperse® from Ligno Tech U.S.A. and water, which can assist in achieving a desirable uniform aqueous coating of the adhesive on the substrate surface.

A preferred film former used with aqueous diluent is a phenolic resole. Low molecular weight, water soluble or partially water soluble phenolic resoles are commercially available. Partially water soluble resoles are suitable also, and available from Georgia Pacific under the trade designation BKUA 2370, BRL 2741 and GPRI 4001. Partially water soluble resoles available from Schenectady International under the trade designations HRJ11722 and SG3100.
Filler If desirable, the adhesive compositions of the present invention may further comprise additives that include, but are not limited to, plasticizers, pigments, inert filler material, reinforcing fillers, dispersants, organosilanes, with the amounts of such additions being within the ranges customarily employed. The adhesive compositions of the present invention may also contain a vulcanizing agent. The vulcanizing agent of the present invention can be any known vulcanizing agent which is capable of crosslinking elastomers at molding temperatures (140–200° C.). Preferred vulcanizing agents for use in the invention are selenium, sulphur, and tellurium, with selenium being most preferred. If employed, the vulcanizing agent is typically utilized in the present invention in an amount ranging from about 1 to 15, preferably from about 2 to 7, percent by dry weight of the total adhesive composition. Generally any type of carbon black can be utilized such as those having low to high DBP absorption (cc/100 g) as from about 50 to about 160 over a wide range of nitrogen adsorption (sq.m/g) as from about 20 to about 150. The amount of carbon black used in some embodiments is generally from about 0.5 to about 10 phr on a dry weight basis.

The adhesive compositions of the present invention, however contain no reactive nitroso group-containing compound, such as dinitrosobenzene (DNB) or are essentially absent a reactive nitroso group-containing compound. "Essentially absent" in this context is defined as present in a tramp impurity amount or an amount less than that which would form noticeable porosity in the cured rubber near the adhesive-elastomer bond interface.

Acid Scavenger

The adhesive compositions of the present invention contain a solid acid-scavenger. Acid scavengers are found among the oxides or salts of iron, nickel, cobalt, copper, zinc, calcium and aluminum, phosphates of zinc, oxides of cadmium, oxides of magnesium, oxides of lead, and oxides of zirconium; zirconium salts;. The suitable lead compounds include dibasic lead phthalate, monohydrous tribasic lead maleate, and tetrabasic lead fumarate. Metal oxides, phosphates, and carbonates of zinc or calcium such as calcium carbonate, aluminum phosphate, zinc phosphate, and zinc oxide, and mixtures of any of these are preferred. The absence of added lead compound is more preferred. "Added" means that a lead compound is not intentionally added when preparing the adhesive, but does not exclude the presence of analytically detectable levels of lead as tramp-, or cross-contamination of lead from raw materials or equipment used to make the adhesive. Preferredly less than 1000 ppm of total lead is present in the adhesive as-used in bonding of the peroxide-cured elastomer to the substrate according to the invention. The acid-scavenger is utilized in an amount ranging from about 2 to 20, preferably from about 5 to 15 percent of the dry weight of the adhesive composition. On the basis of 100 wt. parts of film former, the acid scavenger is used at 15 to 45 phr.

Silica

In the embodiments containing a halogen-containing polymer film former, pre-bake resistance is needed. However it has been found that in conjunction with halogen-containing film forming polymers, precipitated silicas and preferably amorphous precipitated silicas yield good pre-bake resistance whereas fumed silicas do not provide essential pre-bake resistance. If any fumed silica is utilized, the amount thereof is low, i.e. generally less than about 5, desirably less than about 3 weight %. The precipitated silicas are generally spherical and have an average diameter of from about 0.005 or about 0.010 to about 0.030, or about 0.050, or about 0.100 and desirably from about 0.015 to about 0.025 micrometers. The surface area is generally from about 130 to about 170 and preferably from about 140 to about 150 square meters per gram. Examples of such commercially available precipitated silicas include Cabosil CP304 made by Cabot Corporation of Kokoma, Ind.; Aerosil 200 made by Degussa Corporation of Ridgefield Park, N.J. with various products such as HiSil® 233 made by PPG, Inc. of Pittsburgh, Pa., being especially preferred.

The preferred precipitated silicas, for example HiSil® 233 as well as other HiSil® 200 series silicas, are a synthetic white, amorphous silica (silicone dioxide) powders and pellets. They are classed as wet-process, hydrated silicas because they are produced by a chemical reaction in a water solution, from which they are precipitated as ultra-fine, spherical particles having an average diameter as noted above. The particles tend to agglomerate in a loose structure which looks like a grape cluster when magnified by an electron microscope. The surface areas of such precipitated silicas are very large, as noted above. Generally, less than 0.03% by weight of residual particles are retained on a 100 mess U.S. standard screen.

The amount of the precipitated silica on a dry weight basis is generally from about 5 to about 30% by weight and desirably from about 7 to 20% by weight on the dry weight of the adhesive.

EXAMPLES

The following Example A is formulated as an aqueous one-coat especially for bonding peroxide cured EPDM compounds to a variety of substrates such as nylon, copper, brass, stainless steel or aluminum.

Example A

| 1–3% | Aqueous Dispersant |
|---|---|
| 0.05–0.2% | Wetting Agent |
| 2–6% | Precipitated Silica |
| 10–30% | Acid Scavenger, |
| 10–200% | Titanium Dioxide |
| 10–20% | Polymaleimide |
| 40–50% | Phenolic Resole |

The following Example B is a solvent-based, non-conductive one-coat adhesive effective for bonding peroxide elastomers, especially EPDM.

Example B

| 10–20% | Chlorosulfonated Polyethylene |
|---|---|
| 15–25% | Acid Scavenger |
| 35–45% | Polymaleimide |
| 5–15% | Precipitated Silica |
| 10–20% | Isocyanatosilane |

The following Example C is formulated as an aqueous one-coat adhesive effective for bonding peroxide cured delastomers, especially silicone elastomers. This example provides primary adhesion and resistance to hot oil environments for metal substrates including phosphatized steel.

Example C

| 1–2% | Aqueous Dispersant |
|---|---|
| 0.05–0.2% | Wetting Agent |
| 10–20% | Precipitated Silica |
| 15–25% | Acid Scavenger |
| 40–50% | Polymaleimide |
| 2–8% | Carbon Black |
| 10–20% | Phenolic Resole. |

The following Example D is an aqueous one-coat adhesive for bonding a peroxide cured elastomer to a variety of substrates especially substrates such as nylon, copper, brass, stainless steel and aluminum.

Example D

| 1–2% | Aqueous Dispersant |
|---|---|
| 5–15% | Precipitated Silica |
| 15–25% | Acid Scavenger |
| 50–60% | Polymaleimide |
| 10–20% | Chlorosulfonated Polyethylene |

The following Example E is a solvent-based covercoat adhesive especially useful for bonding peroxide cured HNBR compounds. This product is typically applied over a primer. This adhesive provides primary adhesion, resists heat aging, and exposure to jet fuel and motor oils.

Example E

| | |
|---|---|
| 5–15% | Precipitated Silica |
| 55–65% | Polybismaleimide |
| 2–6% | Carbon Black, Reinforces, Filler |
| 20–30% | Chlorinated Natural Rubber |

The following Example F is a solvent based adhesive for bonding fiber cords to rubber in automotive belts and hoses. This adhesive is usually applied over an RFL treated glass cord.

Example F

| | |
|---|---|
| 55–65% | Polybismaleimide |
| 2–5% | Carbon Black |
| 10–20% | Chlorosulfonated Polyethylene |
| 20–30% | polyisocyanate, or isocyanatosilane |

Substrate

The surface to which the material is bonded can be any primer or unprimed surface capable of receiving the adhesive such as a glass, plastic, or fabric surface, and is preferably a metal surface selected from any of the common structural metals such as iron, steel (including stainless steel), lead, aluminum, copper, brass, bronze, MONEL metal alloy (Huntington Alloy Products Div., International Nickel Co., Inc.), nickel, zinc, including treated metals such as phosphatized steel, galvanized steel, and the like. Prior to bonding, a metal surface is typically cleaned according to one or more methods known in the art such as degreasing, grit-blasting and zinc-phosphatizing. The substrate includes woven or nonwoven glass fabrics, or continuous rovings of glass, such as E-glass; fabrics, fibers or rovings of polyamides, polyester, aramids, e.g., Kevlar, a trademark of E. I. du Pont de Nemours Co., (Inc.), of Wilmington, Del., carbon fibers, and stainless steel fibers; ceramics, metals, and the like shaped or in foils or coils. The typical articles of manufacture comprising a peroxide-cured elastomer bonded to metal with the adhesives of the invention are HNBR-glass fiber-rubber drive belts, rubber rolls, engine mounts, metal gaskets and seals for automotive, industrial and aerospace devices.

A primed substrate surface contains a conventional water-based or solvent-based primer applied thereto. Typical water-based primers include phenolic resin-type primers such as CHEMLOK 802, CHEMLOK 805, CHEMLOK 8006, and CHEMLOK 8401 produced by Lord Corporation. Typical solvent-based primers include phenolic resin-type primers such as CHEMLOK 205 or CHEMLOK 207 produced by Lord Corporation. The adhesive composition is typically applied directly to a metal surface or directly to any primer which has been applied to the metal so as to ensure contact between the adhesive composition and the elastomeric substrate which is brought into contact with the coated metal surface. In fabric bonded embodiments, typically the fabric surface to which the peroxide-cured elastomer is bonded may have a conventional resorcinol-formaldehyde latex (RFL) primer applied thereto.

As noted above, the preferred embodiments for the rubber to metal adhesive compositions of the present invention exhibit pre-bake resistance. Pre-bake resistance is defined as a capability of tolerating a pre-bake cycle of about 3 or about 6 minutes and especially about 9 minutes at 380° F. and still maintain the capability of providing a high percentage (80%–100%) rubber tearing or retention on a rigid substrate after vulcanization of the rubber compound. That is, even though heated for up to 3, 6, or 9 minutes at 380° F. before any cure of the nitrile rubber, after cure of the rubber, the adhesive does not fail but rather generally at least 80%, desirably at least 85% or 90% and preferably at least 95% or 100% of the nitrile rubber (bonds) tears during testing of the laminate. Another important advantage is that when loading molds which are preheated to a molding temperature of up to about 400° F, adhesive coated inserts can be exposed to these temperatures for up to several minutes prior to rubber contact and cure initiation. The adhesive must resist pre-curing as a result of such heat exposure. Should the adhesive be pre-cured, the same will typically fail at the rubber-adhesive interface and not provide for desired rubber retention when destructively tested. Sweep resistance is also desirable with regard to adhesive coated seals, and is defined as the resistance to adhesive movement when unvulcanized rubber moves across the pre-baked adhesive during a molding step.

Industrial rubber products such as automobile tires, rubber hoses, power transmission belts and conveyor belts are normally reinforced with fiber materials. Synthetic fibers are widely used as such reinforcing fiber materials since they are in general superior to natural fibers such as cotton, wool or hemp in properties such as strength, modulus of elasticity, resistance to friction and dimensional stability when being exposed to water or heat. In recent years, polyamide fibers including aliphatic polyamide fibers and aromatic polyamide fibers and polyester fibers are especially preferred as reinforcements among a variety of synthetic fibers.

A variety of methods of bonding fibers to rubber compounds or mixes are known, among which there is a well known method wherein fibers are treated with so-called RFL solutions, namely aqueous mixtures of resorcinol/formalin resins and rubber latices, and placed in contact with rubber compounds, and then the rubber compounds are vulcanized together with the fibers. For instance, a method is disclosed in Japanese Patent Laid-open No. 49-96048 in which an RFL solution is used which contains a chlorohydrin rubber latex and a chloroprene rubber latex together with resorcinol/formalin resin for bonding polyamide fibers to chloroprene rubber mixes.

A further method is also disclosed in Japanese Patent Laid-open No. 59-89375 wherein an RFL solution is used which is composed of an aqueous mixture of a chloroprene/dichlorobutadiene copolymer latex and resorcinol/formalin resin.

The adhesives herein provide excellent, durable bonding to difficult to adhere high saturation or complete saturation rubbers such as the aforementioned HNBR, rubber, ethylene/propylene rubber, chlorinated polyethylene, chlorosulfonated polyethylene, epichlorohydrin rubber or fluorocarbon rubber.

Preparation and Use

The adhesive compositions of the present invention may be prepared by any method known in the art, but are preferably prepared by combining and milling or shaking the ingredients and solvent or water vehicle in a ball-mill, sand-mill, ceramic bead-mill, steel bead-mill, high speed media-mill, or the like. The adhesive compositions may be applied to a surface to be bonded by spraying, dipping, brushing, wiping, roll-coating or the like, after which the adhesive composition is permitted to dry. The adhesive composition is typically applied in an amount sufficient to form a dry film thickness ranging from about 0.1 to 2.0 mils, preferably from about 0.2 to 0.8 mils. Adhesive dry film thickness above 2 miles causes cohesive failure, while film thickness less than 0.1 mills can generate failure du to inadequate surface coverage. In the case of a two-coat adhesive composition, the adhesive is applied in a similar manner over the primer coat which has been permitted to completely dry.

The present adhesive compositions have a particular affinity for peroxide-cured elastomers in substantial contact with the elastomer. "At least substantial contact" herein refers to physical contact between the adhesive composition and the elastomeric substrate. The adhesive composition is typically applied to metal surfaces and the coated metal surface and elastomeric substrate are then brought together under heat and pressure to complete the bonding and vulcanizing procedure. In some cases, it may be desirable to preheat the metal surface prior to application of the adhesive composition to assist in drying of the adhesive composition. The coated surface of the metal and the elastomeric substrate are typically brought together under a pressure of from about 20.7 to 172.4 Mega Pascals (MPa), preferably from about 20 MPa to 50 MPa. The resulting rubber-metal assembly is simultaneously heated to a temperature of from about 140° C. to about 200° C., preferably from about 150° C. to 170° C. The assembly should remain under the applied pressure and temperature for a period of from about 3 minutes to 60 minutes, depending on the vulcanizable elastomer cure rate and thickness of the elastomer substrate. This process may be carried out by applying the rubber substrate as a semi-molten material to the metal surface as in, for example, an injection-molding process. The process may also be carried out by utilizing compression molding, transfer molding or autoclave curing techniques. After the process is complete, the bonded adhesive and elastomer are fully vulcanized and ready for use in a final application, such as engine mount, damper, or belting, to name a few typical uses.

The following examples are disclosed in order to further illustrate and fully disclose the invention and are not intended to limit in any manner the scope of the invention which is defined by the claims.

Adhesive Tests F

A conventional aqueous primer (CHEMLOK®8006—Lord Corporation) is sprayed onto grit-blasted steel coupons preheated to 120° F. to 140° F. at a film thickness of 0.3 to 0.5 mils. The adhesive composition (covercoat) is then spray applied to the primed metal coupons, also warmed to 120° to 140° F., at a film thickness of 0.5 to 0.7 mils. The coated coupons are then bonded to HC-100 (natural rubber) substrate by injection molding the rubber onto the coated coupons at 320° F. and then vulcanizing the elastomer at 320° F. for 15 minutes. Some of the coupons are exposed to a pre-bake or pre-cure time delay where the parts are exposed to the molding temperature for a period of 3 or 6 minutes before the rubber is injected into the cavity. This time delay simulates actual production conditions and helps determine if the adhesive remains active enough to successfully bond the rubber compound. The bonded rubber-metal assemblies are then subjected to the tests described below.

Primary Adhesion

Bonded parts are pulled apart to destruction either by hand with pliers, or according to an instrumented method per ASTM Test D429—Method B using a peel angle of 45 degrees on an Instron® tensile tester conducted at room temperature with a test speed of 20 inches per minute. After the bonded part fails, the percent rubber retention on the adhesive coated area of the part is measured.

72-Hour Salt Spray

Bonded parts are buffed on the edges with a grinding wheel. The rubber is then tied back over the metal with stainless steel wire so as to stress the bonded area. This exposes the bond line to the environment. Failure is initiated by scoring the bond line with a razor blade. The parts are then strung on stainless steel wire and placed in a salt spray chamber. The environment inside the chamber is 100° F., 100 percent relative humidity, and 5 percent dissolved salt in the spray, which is dispersed throughout the chamber. The parts remain in this environment for 72 hours. Upon removal, the rubber is peeled from the metal with pliers. The percent rubber retention on the part is then measured and refers to failure in the rubber body (R). Failure is expressed in terms of percent, and a high percent of failure in the rubber is desirable since this indicates that the adhesive bond is stronger than the rubber itself.

Example 1

An aqueous diluted dispersion is made which contains the following:

| Component | % dry weight |
|---|---|
| Marasperse ® | 1.5 |
| Polywet ® | 1.5 |
| Poly(bis maleimide) | 52 |
| Zinc oxide | 15 |
| Silica | 5 |
| $TiO_2$ | 15 |
| Water dispersible Phenolic resole | 10 |
| Total dry | 100 |
| Total solids | 30% |

This adhesive was spray applied to zinc-phosphatized steel at a dry film thickness (DFT) of 0.005 in (0.5 mils). Several peroxide cured elastomers were bonded to the adhesive treated metal at 340° F. and 375° F.

| Results: | % rubber retention |
|---|---|
| Peroxide-cured silicone elastomer A | 100 R |
| Peroxide-cured silicone elastomer B | 100 R |
| Peroxide-cured silicone elastomer C | 100 R |
| Peroxide-cured silicone elastomer D | 90 R |
| ZSC-cured HNBR (peeled at 2" per min. @45°) | 90 R |
| Peroxide cured NBR A | 100 R |
| Peroxide cured NBR B | 100 R |

Example 2

A solvent diluted (25% TSC) adhesive was prepared using xylene as the solvent:

| | % dry weight | | |
|---|---|---|---|
| Component | 2A | 2B | 2C |
| Precipitated silica | 10 | 10 | 10 |
| bismaleimide | 0 | 0 | 30 |

-continued

| Component | % dry weight | | |
|---|---|---|---|
| | 2A | 2B | 2C |
| Carbon black | 5 | 5 | 10 |
| Polybismaleimide | 65 | 70 | 30 |
| Chlorinated NR | 20 | 15 | 15 |
| Total dry | 100 | 100 | 100 |

Example 3

A solvent-diluted (25% TSC) adhesive was prepared using toluene and containing:

| Component | % dry weight | | |
|---|---|---|---|
| | 3A | 3B | 3C |
| Poly (bismaleimide) | 49 | 40 | 40 |
| Precipitated silica | 10 | 10 | 0 |
| TiO$_2$ | 10 | 10 | 5 |
| Carbon black | 1 | 1 | 1 |
| Zinc Oxide | 0 | 10 | 9 |
| Fumed silica | 0 | 0 | 5 |
| Total dry | 100 | 100 | 100 |

This adhesive was spray applied to zinc-phosphatized steel at a dry film thickness (DFT) of 0.0005 in (0.5 mils). The vulcanizable elastomer (Bonded Rubber) was bonded to the adhesive treated metal at 340° F. for 15 min. cure time. Primary Adhesion

| Bonded Rubber | Prebake (time, temp.) | Lbs. (p.s.i.) % rubber retention (failure mode) | | |
|---|---|---|---|---|
| | 0' | Ex. 3A | Ex. 3B | Ex. 3C |
| NR | | 79 (RC) | 97 (RC) | 97 (RC) |
| | | 3 (R) | 2 (R) | 2 (R) |
| | | 40 (CM) | 5 (CM) | 5 (CM) |
| | 5' @ 355° F. | 96 (RC) | 96 (RC) | 80 (RC) |
| | | 4 (R) | 4 (R) | 20 (R) |
| Peroxide cure EPDM | 7.5' @ 355° F. | 8 (CM) | 5 (RC) | 100 (R |
| | | 93 (R) | 95 (R) | |
| Peroxide cure EPDM | 7.5' @ 355° F. | 100 (R) | 100 (R) | 100 |
| Peroxide cure Silicone | 2.5' @ 375° F. | 100 (R) | 5 (RC) | 2 (RC) |
| | | | 95 (R) | 98 (R) |
| Peroxide cure Silicone | 2.5' @ 375° F. | 100 (R) | 100 (R) | 100 (R) |

Example 4
25% Solids in Xylene

| Component | % dry weight |
|---|---|
| xylene 300 wet parts | 10 |
| Precipitated silica | |
| Poly (bismaleimide) | 62.5 |
| Zinc Oxide | 7.5 |

-continued

| Component | % dry weight |
|---|---|
| Chlorinated natural rubber | 20 |
| Total dry wt. | 100 |

Results bonding HNBR elastomer:

| | Pre-Bake Time (min.) | p.s.i. | % Rubber Failure |
|---|---|---|---|
| Primary Adhesion | 0' | 26 | 100R |
| | 2' | 35 | 100R |
| | 4' | 30 | 90R |
| Heat aged 12 Hrs. | 0' | | 100R |
| | 3' | | 100R |
| After 1 week salt spray | 0' | | 100R |
| Oil immersion 8 days | 0' | | 100R |
| | 3' | | 100R |
| After 8 days RT immersion in Jet fuel | 0' | | 100R |

It is understood that the foregoing description of preferred embodiments is illustrative, and that variations may be made in the present invention without departing from the spirit and scope of the invention. Although illustrated embodiments of the invention have been shown and described, a latitude of modification, change and substitution is intended in the foregoing disclosure, and in certain instances some features of the invention will be employed without a corresponding use of other features. Accordingly, it is appropriate that the appended claims are to be construed in a manner consistent with the scope of the invention.

What is claimed is:

1. A peroxide-cured elastomer adhesive composition, said composition absent a reactive nitroso group containing compound and consisting essentially of a diluent, a film former, a polymaleimide compound, a precipitated silica, and an acid scavenger, wherein said adhesive exhibits rubber tearing bonds between the vulcanizate of said peroxide-cured elastomer and substrate with said adhesive therebetween.

2. An adhesive composition according to claim 1 wherein the maleimide compound is a bis-maleimide.

3. An adhesive composition according to claim 2 wherein the maleimide compound is m-phenylene bismaleimide.

4. An adhesive composition according to claim 2 wherein the maleimide compound is an aromatic polymaleimide compound having from about 2 to 100 aromatic nuclei wherein no more than one maleimide group is directly attached to each adjacent aromatic ring.

5. An adhesive composition according to claim 1 further consisting essentially of a phenolic resole.

6. The adhesive composition according to claim 1 further consisting essentially of a polyisocyanate.

7. The adhesive composition according to claim 1 further consisting essentially of an isocyanatosilane.

8. The adhesive composition of claim 1 wherein said film former is selected from the group consisting of chlorinated natural rubber, polychloroprene, chlorinated polychloroprene, chlorinated polybutadiene, a chlorinated butadiene styrene copolymer, chlorinated ethylene propylene copolymer, a chlorinated ethylene/propylene/non-conjugated diene terpolymer, chlorinated polyethylene, chlorosulfonated polyethylene, and a copolymer of α-chloroacrylonitrile and 2,3-dichloro-1,3-butadiene, and mixtures thereof.

9. An adhesive composition according to claim 1 wherein the acid scavenger comprises a metal salt or oxide selected from the group consisting of the oxides and phosphates of zinc, oxides and phosphates of cadmium, oxides of magnesium, oxides and phosphates of aluminum, oxides of zirconium, zirconium salts, and combinations thereof.

10. An adhesive composition according to claim 1 wherein the acid scavenger comprises a lead-containing compound selected from the group consisting of dibasic lead phthalate, monohydrous tribasic lead maleate, tetrabasic lead fumarate, dibasic lead phosphite, basic lead carbonate, lead oxide, lead dioxide and combinations thereof.

11. An adhesive composition according to claim 1 further comprising a supplemental polymeric film-forming other than said film former, in an amount ranging from about 5 to 40 wt. %, wherein said maleimide compound is present in an amount from about 20 to 70 wt. %, said acid scavenger is present in an amount ranging from about 2 to 20 wt. % on dry weight of the total adhesive composition.

12. An adhesive composition according to claim 11 wherein the supplemental polymeric film-forming component is present in an amount ranging from about 5 to 20 wt. %, the maleimide compound is present in an amount ranging from about 40 to 60 wt. %, and the acid-scavenging compound is present in an amount ranging from about 5 to 15 wt. % of the dry weight of the adhesive composition.

13. An adhesive composition according to claim 11 wherein the film former is a halogenated polyolefin and the supplemental film former is a bromine-containing synthetic rubber.

14. An adhesive composition according to claim 11 wherein the supplemental film former is a butadiene polymer is selected from the group consisting of a homopolymer of 2,3-dichloro-1,3-butadiene and a copolymer of 2,3-dichloro-1,3-butadiene and α-bromoacrylonitrile.

15. An aqueous one-coat adhesive for bonding a peroxide cured elastomer to a substrate, consisting essentially of, in wt. percent:

1–3% of an aqueous dispersant, from 0.05–0.2% of a wetting agent, from 2–6% of a precipitated silica, from 10–30% of an acid scavenger, from 10–20% of titanium dioxide, from 10–20% of a polymaleimide, from 40–50% of a phenolic resole, and water to 100%.

16. A solvent-based, non-conductive one-coat adhesive effective for bonding peroxide cured elastomer to a substrate, consisting essentially of, in wt. percent, from 0–20% of chlorosulfonated polyethylene, from 15–25% of an acid scavenger, from 35–45% of a polymaleimide, from 5–15% of precipitated silica, from 10–20% of an isocyanatosilane, and solvent to 100%.

17. An aqueous one-coat adhesive effective for bonding peroxide cured elastomers to a substrate, consisting essentially of, in wt. percent, from 1–2% an aqueous dispersant, from 0.05–0.2% of a wetting agent, from 10–20% of a precipitated silica, from 15–25% of an acid scavenger, from 40–50% of a polymaleimide, from 2–8% of carbon black, from 10–20% of a phenolic resole and water to 100%.

18. An aqueous one-coat adhesive for bonding a peroxide cured elastomer to a substrate, consisting essentially of, in wt. percent, from 1–2% of an aqueous dispersant, from 5–15% of a precipitated silica, from 15–25% of an acid scavenger, from 50–60% of a polymaleimide, and from 10–20% of chlorosulfonated polyethylene, and water to 100%.

19. A solvent-based covercoat adhesive for bonding a peroxide curing elastomer to a primer-coated substrate, consisting essentially of in wt. percent, from 5–15% precipitated silica, from 55–65% of polymaleimide, from 2–6% of carbon black, from 20–30% of chlorinated natural rubber, and solvent to 100%.

20. A solvent based adhesive for bonding RFL-treated fiber cords to vulcanizable rubber, said adhesive applied over said RFL-treated glass cord, and consisting essentially of in wt. percent, from 55–65% of a polymaleimide, from 2–5% of carbon black, from 10–20% of chlorosulfonated polyethylene, from 20–30% of a diisocyanate, and solvent to 100% wherein said adhesive exhibits rubber-tearing bonds to said RFL-treated fiber chords.

* * * * *